US011760670B2

(12) United States Patent
Messias de Araújo, Jr.

(10) Patent No.: US 11,760,670 B2
(45) Date of Patent: Sep. 19, 2023

(54) FIXED BIOFILM ANAEROBIC-AEROBIC COMBINED REACTOR FOR TREATING WASTEWATER

(71) Applicant: Bio Proj Tecnologia Ambiental Ltda., São Carlos (BR)

(72) Inventor: Moacir Messias de Araújo, Jr., São Paulo (BR)

(73) Assignee: BIO PROJ TECNOLOGIA AMBIENTAL LTDA., São Carlos (BR)

( * ) Notice: Subject to any disclaimer, the term of this patent is extended or adjusted under 35 U.S.C. 154(b) by 261 days.

(21) Appl. No.: 17/416,440

(22) PCT Filed: Apr. 18, 2019

(86) PCT No.: PCT/BR2019/050142
§ 371 (c)(1),
(2) Date: Jun. 18, 2021

(87) PCT Pub. No.: WO2020/124179
PCT Pub. Date: Jun. 25, 2020

(65) Prior Publication Data
US 2022/0073390 A1 Mar. 10, 2022

(30) Foreign Application Priority Data
Dec. 19, 2018 (BR) .................. 10 2018 076599-0

(51) Int. Cl.
*C02F 3/30* (2023.01)
*C02F 1/00* (2023.01)
(Continued)

(52) U.S. Cl.
CPC .............. *C02F 3/301* (2013.01); *C02F 1/006* (2013.01); *C02F 3/006* (2013.01); *C02F 3/20* (2013.01);
(Continued)

(58) Field of Classification Search
CPC .......................... C02F 1/006; C02F 2001/007; C02F 2101/30; C02F 3/006; C02F 3/20;
(Continued)

(56) References Cited

U.S. PATENT DOCUMENTS

| 4,983,299 A | 1/1991 | Lupton et al. |
| 5,217,616 A | 6/1993 | DeFilippi et al. |

(Continued)

FOREIGN PATENT DOCUMENTS

| AU | 1560800 A | 5/2001 |
| BR | PI0605467 A | 7/2008 |

(Continued)

OTHER PUBLICATIONS

English machine translation: Araujo Jr et al, the article "Biorreator combinado Anaerobio-Aerobio de Leito Fixo Para Tratamento de Esgoto Sanitario" (Year: 2017).*

(Continued)

*Primary Examiner* — Claire A Norris
(74) *Attorney, Agent, or Firm* — Troutman Pepper Hamilton Sanders LLP; Ryan A. Schneider; Sarah M L Wilkening

(57) ABSTRACT

The present invention concerns a biological reactor used in the field of sanitation for the treatment of sewage and industrial wastewater. The solution proposed in this invention is the coupling of two different treatment processes (anaerobic and aerobic) in the same fixed bed reactor. The invention aims to allow for the construction of plants for the treatment of sewage or very compact industrial effluents, where it is possible to achieve high treatment efficiencies with a small implantation area. In addition, due to the combination of the anaerobic and aerobic processes in fixed beds in the same reactor, the system consumes less energy for aeration and generates a smaller amount of sludge, considerably reducing the operating costs of the treatment plant.

19 Claims, 2 Drawing Sheets

(51) Int. Cl.
  *C02F 3/00* (2023.01)
  *C02F 3/20* (2023.01)
  *C02F 3/28* (2023.01)
  *C02F 101/16* (2006.01)
  *C02F 101/30* (2006.01)

(52) U.S. Cl.
  CPC ...... *C02F 3/2806* (2013.01); *C02F 2001/007* (2013.01); *C02F 2101/16* (2013.01); *C02F 2101/30* (2013.01); *C02F 2203/006* (2013.01); *C02F 2209/225* (2013.01)

(58) Field of Classification Search
  CPC .... C02F 3/2806; C02F 3/301; C02F 2101/16; C02F 2103/002; C02F 2103/005; C02F 2201/002; C02F 2203/006; C02F 2209/22; C02F 2209/225; C02F 3/06; C02F 3/30; C02F 3/302; Y02E 50/30; Y02W 10/10
  USPC ........................................................ 210/96.1
  See application file for complete search history.

(56) References Cited

U.S. PATENT DOCUMENTS

| | | |
|---|---|---|
| 5,403,487 A | 4/1995 | Gencer et al. |
| 7,794,599 B2 | 9/2010 | Monosov et al. |
| 2007/0251880 A1 | 11/2007 | Johann et al. |

FOREIGN PATENT DOCUMENTS

| | | | | |
|---|---|---|---|---|
| BR | 102015001681 A2 | | 6/2017 | |
| CN | 206692391 U | * | 12/2017 | |
| CN | 108726737 A | * | 11/2018 | ............... C02F 9/00 |
| EP | 2346788 A1 | | 7/2011 | |
| RU | 141341 U1 | * | 5/2014 | |
| WO | 1998019971 A1 | | 5/1998 | |

OTHER PUBLICATIONS

International Search Report and Written Opinion for International Application No. PCT/BR2019/050142 dated Jul. 24, 2019, 13 pages.

Araujo Jr et al.: "Biorreator combinado anaeróbio-aeróbio de leito fixo para tratamento de esgoto sanitário", Congresso Abes Fenasan 2017, Sao Paulo, SP, Brasil.

Freitas et al.: "Effect of hydraulic retention time on hydrodynamic behavior of anaerobic-aerobic fixed bed reactor treating cattle slaughterhouse effluent", ACTA Scientiarum, vol. 39, No. 4, Oct. 2017 (Oct. 1, 2017), pp. 469-476, XP055720442.

Araujo Jr, M. M. et al.: "An upflow fixed-bed anaerobic- aerobic reactor for removal of organic matter and nitrogen from L- lysine plant wastewater", Canadian Journal of Civil Engineering, vol. 36, No. 6, Jun. 26, 2009 (Jun. 26, 2009), pp. 1085-1094.

Netto, A. P. et al.: "Treatment of Domestic Sewage in an Anaerobic-Aerobic Fixed-bed Reactor with Recirculation of the Liquid Phase", Clean—Soil, Air, Water, vol. 40, Jul. 26, 2012 (Jul. 26, 2012), pp. 965-971, XP055720443.

* cited by examiner

FIXED BIOFILM ANAEROBIC-AEROBIC COMBINED REACTOR FOR TREATING WASTEWATER

TECHNICAL FIELD

The present invention concerns a biological reactor used in the field of sanitation and wastewater for the treatment of sewage and industrial wastewater.

DESCRIPTION OF THE STATE OF THE ART

Historically, the treatment of sanitary sewage and industrial wastewater has been carried out using an aerobic process. Since 1960, conventional activated sludge systems and extended aeration systems have been widely used, especially in sewage treatment plants in Brazil and worldwide. However, despite the high quality of the final effluent produced by these systems, the footprint of the units, the need for a rear unit for sludge sedimentation, the large amount of sludge generated and the high energy expenditure for aeration have led to the search for alternative wastewater treatment processes.

The development of upflow anaerobic sludge bed (UASB) reactors operated with a high cell retention time and low hydraulic retention time has revolutionized the treatment of industrial wastewater and sanitary sewage. The use of these reactors has proved economically advantageous, due to their operational simplicity and reduced energy expenditure, especially in tropical and subtropical regions where ambient temperature favors anaerobic digestion. Brazil is a great global example of the use of these reactors for the treatment of sanitary sewage, with several full-scale plants having been implemented and in operation for decades.

Combined with the great advantages of UASB technology, other reactor models have been developed for wastewater and sewage treatment. However, few advances have been achieved in increasing the volumetric capacity of the reactors (fraction of the volume of sewage treated in relation to the volume of the reactor), because the ascending velocity in the cross-section of the reactor cannot be above 0.6-0.7 m/h (necessary so that there is no elevation of the sludge bed and loss of anaerobic biomass in the reactor effluent), which makes it necessary to have a large area for the implantation of the reactor.

Considering the use of anaerobic reactors, due to the constant increase in environmental restrictions on the release of effluents into receiving water bodies (rivers, lagoons, seas, etc.), it is currently essential to pro-treat effluents in order to remove the remaining organic matter and nutrients (nitrogen and phosphorus). Another limiting factor of anaerobic reactors is the release of unpleasant odors by the biogas generated, which has a great impact on the surrounding communities, often rendering their use impossible.

To solve this problem, the present invention presents the solution of coupling the fixed biofilm aerobic reactor above the anaerobic reactor. In the anaerobic stage, approximately 60% to 70% of the organic matter is digested and transformed into biogas. The organic matter, the remaining nitrogen compounds and biogas are sent for treatment in the aerobic stage, where they will be oxidized and removed.

Currently, there are several types of systems for the treatment of sewage and industrial wastewater, which use various processes, materials and construction geometries. However, this patent introduces inventive elements that differentiate the proposed system from the others, since it is the only one that presents a fixed biofilm system that combines anaerobic and aerobic processes, in addition to the physicochemical process, in the same reactor. Besides being much more compact than the conventional systems presented, which is reflected in its lower implementation cost, it also has a lower operating cost due to its low sludge generation and low energy consumption, both key elements to preserve important environmental resources.

By way of a bibliographic review of the invention, the patents listed in Table 1 are worthy of note.

TABLE 1

REFERENCE OF PUBLISHED PATENTS.

| Document number | Filing Date | Title | IPC |
|---|---|---|---|
| PI060546 7-6 | 30 Nov. 2006 | Device for cellular immobilization in wastewater treatment systems | C02F3/10 |
| PI9712753-1A | 29 Oct. 1997 | Equipment for biological purification of wastewater | C02F3/30 |
| BR102015001681-6A2 | 26 Jan. 2015 | Anoxic-oxic reactor for the simultaneous nitrification and denitrification of a fixed bed with biofilm | C02F3/30 C02F9/14 |
| PI9917557-6A | 12 Nov. 1999 | Biological wastewater purification plant with two anaerobic digesters and a purification process | C02F3/30 C02F3/28 |
| US7794599B2 | 13 Feb. 2004 | Bioreactor system for multi- stage biological wastewater treatment | C02F3/103 |
| US5217616A | 6 Dec. 1991 | Process and apparatus for removal of organic pollutants from waste water | C02F3/28 C02F3/12 |
| US5403487A | 22 Dec. 1992 | Process for biochemical oxidation of ultra-toxic wastewater in a packed bed bioreactor | C02F3/28 C02F3/12 |
| US4983299 | 10 Apr. 1989 | Removal of phenols from waste water by a fixed bed reactor | C02F3/28 C02F3/06 |
| US2007/0251880A1 | 29 Oct. 2004 | Reactor and Method for Anaerobic Wastewater Treatment | C02F3/28 C02F3/10 |

Patent PI0605467-6, of the same holder as the present invention, describes a device for cellular immobilization used in wastewater treatment systems, characterized by being constructed from a polyurethane foam encased in an external polypropylene structure. Although said device is used in effluent treatment plants, its patent does not describe and does not claim a specific treatment process, which is the purpose of this patent.

Patent PI9712753-1A refers to an apparatus for the biological purification of residuary water comprising the assembly of an activated sludge aerobic reactor on an upflow anaerobic sludge bed (UASB) reactor. The inventive activity of this system consists in the use of conventional suspended biomass processes (UASB reactor followed by an activated sludge reactor) separated by means of a partition that allows for the passage of the flow from the anaerobic reactor to the aerobic reactor without the aerobic sludge returning to the anaerobic reactor. This invention differs from the present patent in its treatment processes. In the cited patent, suspended biomass processes (UASB and activated sludge) are used, while in the present patent immobilized biomass processes are used on an inert support. Thus, with the fixed biomass, it is possible to considerably increase the amount of anaerobic and aerobic biomass in the reactor and double its capacity to treat sanitary sewage. Another factor that differentiates this application is the fact that in the present patent, in addition to the liquid effluent, the biogas generated in the anaerobic stage also passes through the aerobic bed, which causes biogas pollutants to be oxidized in the aerobic stage. Another differentiating factor is that, in the aforementioned patent, flotation equipment is used to separate solids in the aerobic stage, while in the present patent a high-rate gravity decanter is used with decanting plates and coagulant dosage to remove solids and phosphorus from the effluent.

Patent BR102015001681-6A2 presents a fixed bed anoxic-oxic reactor for removing nitrogen from wastewater. This invention is characterized by the use of only one reaction bed containing polyurethane foam cubes with a 2 cm edge and an aeration system that keeps the concentration of dissolved oxygen in the liquid below 1.0 mg $O_2$/L. This invention differs from the present patent in using only one reaction bed, and not the combination of two different beds (anaerobic bed and aerobic bed) as presented in this patent. There is also a difference in the supporting material used for the immobilization of the biomass. The aforementioned invention uses polyurethane foam cubes, which suffer limitations regarding their use in full-scale plants due to the compression and compaction of the bed (an effect caused by the buoyancy force in the foams). In the present patent, polyurethane foam matrices are used surrounded by a rigid polypropylene structure, which prevents foam compression and the clogging of the bed in large-scale reactors.

Patent PI9917557-6A is a residual water purification plant with two anaerobic digesters, the first with a fixed bed for fixation of the acidogenic bacteria and the second with a fluidized bed for fixation of the methanogenic bacteria. The difference with this invention in relation to the present patent is that it does not combine the anaerobic and aerobic processes in the proposed system, as is done in the present patent. Another differentiating factor is that the aforementioned invention uses two separate anaerobic reactors to allow for the process of complete anaerobic digestion (acidogenesis+methanogenesis). While the present patent proposes an anaerobic fixed bed reactor capable of performing the processes of acidogenesis and methanogenesis together in the same reaction bed, considerably reducing the volume required and making the plant more compact.

Patent U.S. Pat. No. 7,794,599B2 proposes the use of fibers to fix the biomass arranged longitudinally in multi-stage horizontal biological reactors for treating residuary water. This invention differs entirely from the proposal of the present patent: (1) having a different biomass supporting material, using synthetic material fibers where the present patent uses polyurethane foam structured with polypropylene); (2) having a different biological process, using only an aerobic process where the present patent proposes the use of a combined anaerobic-aerobic process; (3) having a different reactor geometry, using a multi-stage horizontal reactor where the present patent proposes a vertical upflow reactor.

U.S. Pat. Nos. 5,217,616A, 5,403,487A, 4,983,299 and US2007/0251880A1, despite using fixed biomass biological processes, differ from the present patent due to the non-use of combined anaerobic-aerobic processes in the same reactor, using only one treatment process, anaerobic or aerobic. Supporting materials are also used for the adhesion of the biomass that are significantly different from what is proposed by the present patent.

AIMS OF THE INVENTION

The purpose of the invention is to present the solution of coupling two different treatment processes in the same fixed bed reactor (anaerobic and aerobic) for the treatment of sanitary sewage and industrial effluents.

Another objective of the invention is to enable the construction of plants for the treatment of sewage or very compact industrial effluents, where it is possible to achieve high treatment efficiencies with a small footprint. In addition, due to the combination of anaerobic and aerobic processes in fixed beds in the same reactor, the system consumes less energy for aeration and generates a smaller amount of sludge, considerably reducing the operating costs of the treatment plant. Both (sludge and energy) are very demanding and have an important impact on operational costs and impact on the environment.

DESCRIPTION OF THE INVENTION

Figure 1:
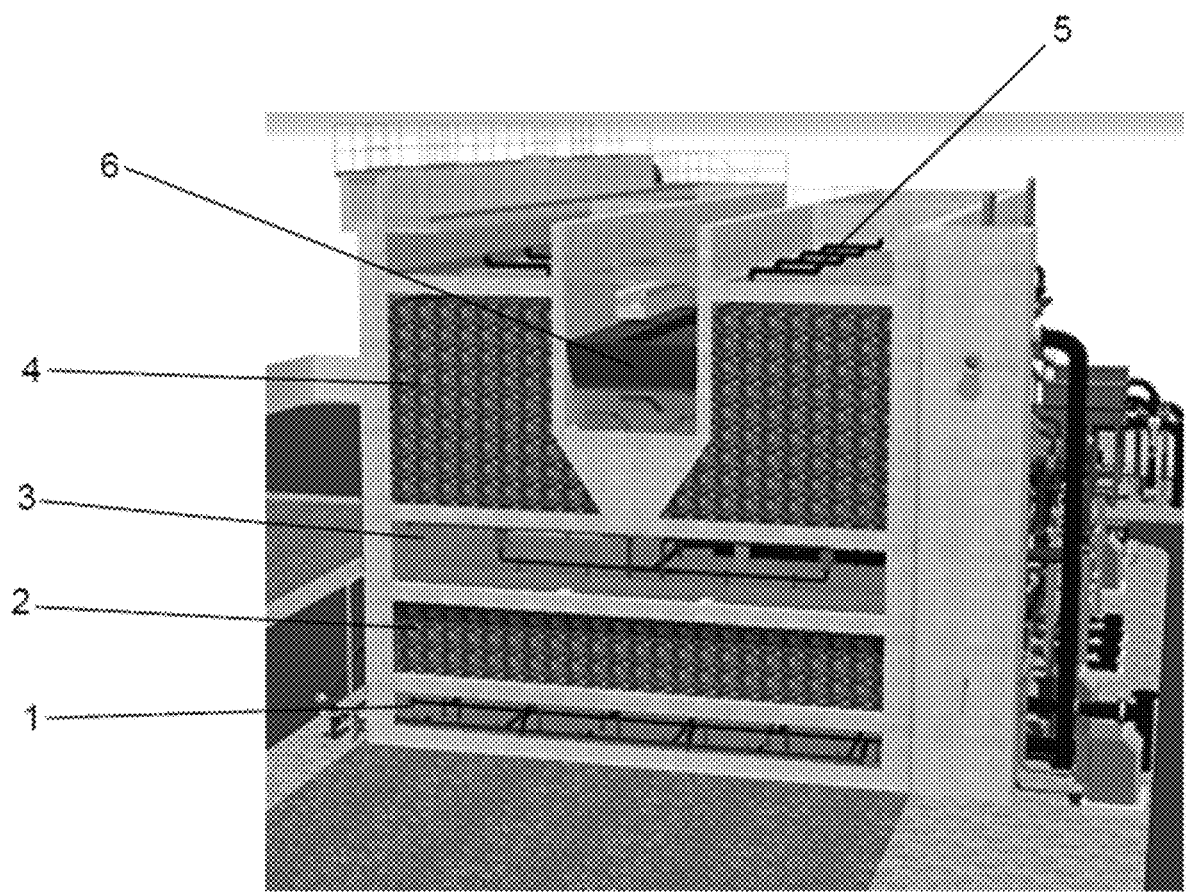
FIG. 1 illustrates the fixed biofilm anaerobic-aerobic combined reactor.

As illustrated by FIG. 1, at the bottom of the reactor, there is a hybrid anaerobic reactor, which combines the suspended biomass process (stem blanket) with the fixed biomass process, responsible for removing 60% to 70% of the affluent organic matter. The fixed biofilm aerobic reactor is positioned at the top of the reactor, which is responsible for the removal of the organic matter and the oxidation of the biogas effluents from the anaerobic stage, in addition to removing nitrogen. The biological treatment is complemented by a chemically-assisted high-rate tertiary decanter, providing for the removal of phosphorus and clarification of the treated effluent.

The fixed biofilm anaerobic-aerobic combined reactor is characterized by having vertical geometry with ascending flow and possessing six different zones along its height:

1. Anaerobic sludge feed and removal chamber (1): place where the affluent sewage enters the reactor and is evenly distributed across the reactor base through a network of pipes. In this chamber the network of pipes for removing the anaerobic sludge sedimented at the bottom of the reactor is also installed, which has several trunk sewers that cover the entire bottom area of the reactor, preventing the periodic accumulation of sludge.

2. Fixed Anaerobic Biofilm Bed (2): the place where the anaerobic biofilm grows fixed to a porous supporting material. This supporting material is characterized by having a high surface area (over 90,000 $m^2/m^3$), not being compressible and providing high porosity to the reaction bed (over 65% porosity), which allows for there to be a large amount of adhered biomass without the bed suffering compaction and clogging, keeping the hydrodynamic flow constant during the entire operation of the system. The supporting material is confined between fixed grilles, keeping the anaerobic biofilm permanently fixed in position just after the feeding chamber and below the aeration chamber.

3. Aeration Chamber (3): the place where the system that provides for the oxygenation of the aerobic bed immediately above this chamber is installed. The aeration system is composed of fine air bubble ejectors, or similar systems, that cause the dissolution of the atmospheric oxygen in the liquid medium. These ejectors are powered by water pumps that provide the motive force of the mixture and by air blowers that provide atmospheric air to the system. The high speed of the water inside the ejectors generates a high-pressure region that dissolves the air in the water. This water with dissolved air suffers decompression as soon as it leaves the ejector and releases the air into the liquid medium in the form of small bubbles, increasing the efficiency of the oxygen dissolution.

4. Aerobic Fixed Biofilm Bed (4): the place where the aerobic biofilm grows fixed to a porous supporting material. Similar to that used in the anaerobic bed, this supporting material is characterized by having a high surface area (over 90,000 $m^2/m^3$), not being compressible and providing high porosity to the reaction bed (over 65% porosity), which allows for there to be a large amount of adhered biomass without the bed suffering compaction and clogging, keeping the hydrodynamic flow constant throughout the entire operation of the system. The supporting material is confined between fixed grilles, keeping the aerobic biofilm permanently fixed in position just after the aeration chamber and below the effluent outlet chamber of the biological treatment.

5. Effluent Outlet Chamber of the Biological Treatment (5): the place where the treated effluent from the biological reactor is collected uniformly across the area of the top of the reactor through a network of pipes, located above the containment grille of the fixed aerobic biofilm bed. The collected effluent continues to the high-rate tertiary decanter.

6. High-Rate Tertiary Decanter (6): the place where the remaining suspended solids from the biological process are sedimented and compacted by the gravitational process. The tertiary decanter also has the function of clarifying and removing phosphorus from the liquid medium. By adding coagulants, such as ferric chloride and ferric sulfate, among others, to the feeding pipe of the tertiary decanter, phosphate salts and flakes of colloidal material are formed and sedimented together with the suspended solids. The sedimented sludge is discarded as a solid residue of the treatment process.

The biomass supporting material layer located at the top of the anaerobic reactor, in addition to providing an increase in the amount of anaerobic biomass, also functions as a physical barrier to the suspended biomass (sludge bed), which remains confined at the bottom of the reactor. Thus, it is possible to increase the ascension velocity to values above 1.4 m/h, doubling the volumetric capacity of the reactor treatment. The proposed solution causes the anaerobic stage of treatment of the fixed biofilm anaerobic-aerobic combined reactor, as shown in FIG. 1, to be highly efficient, requiring only a small reaction volume.

In the anaerobic stage, approximately 60 to 70% of the organic matter is digested and transformed into Biogas (composed of 35% carbon dioxide and 65% methane). The remaining organic matter and nitrogen compounds are sent for treatment in the aerobic stage, where they will be oxidized and removed from the liquid phase.

Figure 2:
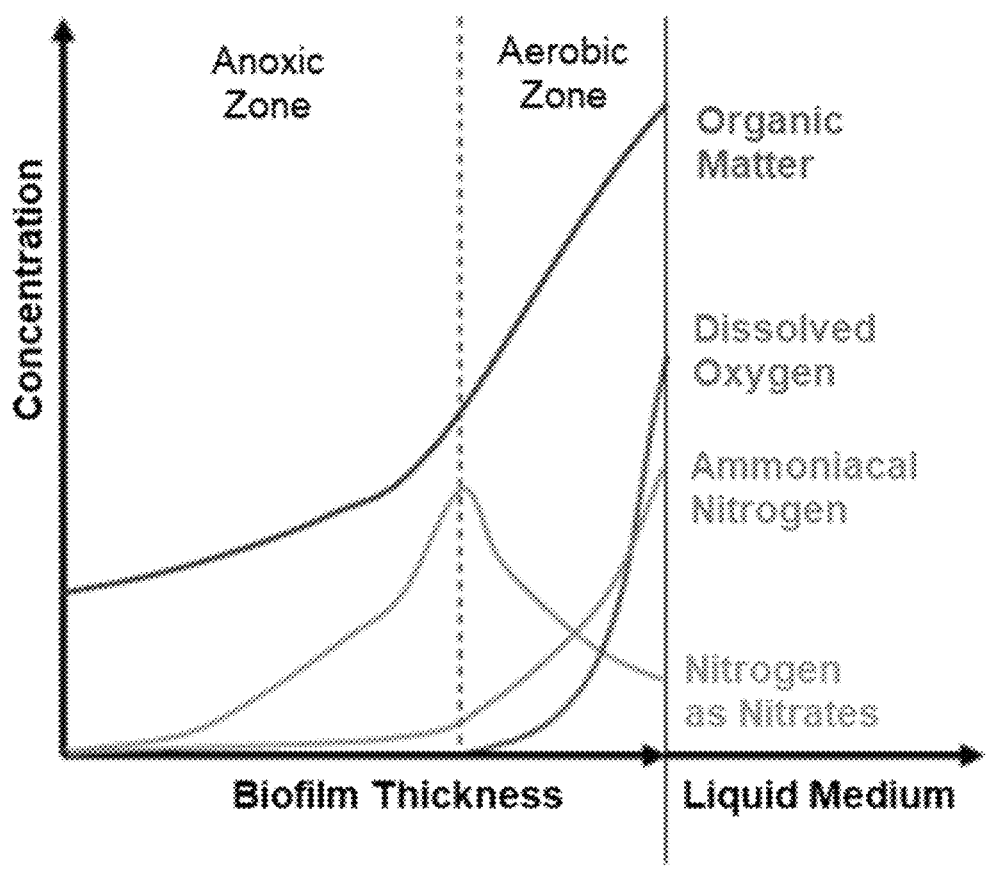
FIG. 2 shows the schematic structure of the layers formed by the biofilm in the aerobic stage (anoxic and aerobic zones) and the concentrations of organic matter, dissolved oxygen, nitrogen in ammoniacal form and nitrogen in the form of nitrates along the thickness of the biofilm.

In the aerobic stage, the oxygen dissolved in the liquid medium is monitored and controlled by a field oximeter connected to an automatic control mesh that acts on the flow of the air blower, assuring the oxygen supply in accordance with the demands of the process and reducing energy waste. Controlling the oxygen dissolved in the medium is important, in addition to removing the organic matter, to ensure the complete removal of the nitrogen through the simultaneous nitrification and denitrification processes, Due to the characteristics of the biomass supporting material used in the aerobic stage, the biofilm is formed in different layers, as shown in FIG. 2, selecting the microorganisms in accordance with the substrate concentrations and electron acceptors present in the medium. Thus, in the same reaction bed, it is possible to combine processes for removing organic matter (heterotrophic respiration) and nitrogen (nitrification and denitrification).

The aeration system is composed of air ejectors that provide for the mixing and dissolution of oxygen in the liquid, which are fed by liquid recirculation pumps and blowers. These ejectors work on the "Venturi" principle and possess high efficiency in the transfer of oxygen to the liquid, which assures lower energy consumption to the aeration system. These ejectors are installed in the aeration chamber (3) between the anaerobic (2) and aerobic (4) beds.

Both in the anaerobic and aerobic stages, a special support is used for the fixation of the biomass, consisting of a polyurethane foam matrix (where the biomass is adhered) protected by an external polypropylene structure. This material has a surface area of over 90,000 $m^2/m^3$ and bed porosity of over 65%, which allows for a high concentration of biomass in the reactors without clogging the bed and preferential paths, ensuring high efficiency in the treatment of sewage in small reaction volumes.

For both stages, anaerobic and aerobic, the hydraulic retention time (HRT) is 3 to 5 hours, and the total HRT of the biological system is 6 to 10 hours. In both reaction beds, the supporting material is confined by grilles that have a passage area of over 60% of the total area. These grilles can be constructed from different materials, the most commonly used being steel, stainless steel, carbon steel, PRFV, among others.

As the active biomass is permanently adhered to the biomass supporting medium, sludge production is minimal, with a small concentration of total suspended solids (TSS) at concentrations lower than 50 mg/L in the effluent of the biological reactor, which are removed in the tertiary decanter.

The high-rate tertiary decanter (6) can have prismatic, cylindrical or conical geometry, being positioned at the top of the reactor, within the reaction bed of the aerobic stage. Inside are installed triangular section sloping plates to increase the sedimentation area, enabling the operation of the decanter with hydraulic application rates of over 50 $m^3/m^2/d$.

In the inlet pipe of the decanter a coagulating agent (ferric chloride, aluminum sulfate, etc.) is dosed by means of dosing pumps. This dosage causes the coagulation and flocculation of the colloidal material and the precipitation of the phosphorus. As a result, high clarification of the treated effluent and removal of total phosphorus with a final concentration below 1.0 mg/L is achieved.

The solids sedimented in the decanter, with a concentration of total suspended solids of approximately 2%, are discarded for the sludge dehydration stage of the treatment plant and later disposed of as solid residue.

The removal of the excess solids in the anaerobic stage is performed by disposal through the bottom of the reactor. This sludge, with an approximate concentration of total suspended solids of 3%, is discarded for the sludge dehydration step of the treatment plant and later disposed of as solid residue.

The proposed invention is subject to constructive variables, i.e., it is possible to modify the geometry of the cross-section of the reactor (circular, square, rectangular, etc.), its construction materials (metal, reinforced concrete, PRFV, etc.), the materials of the pipes (PVC, carbon steel, stainless steel, etc.) and its internal structure (concrete, PRFV, stainless steel, etc.). The essential thing is to maintain the vertical shape with ascending flow and that it have six steps along its height: Feeding chamber (1) and anerobic sludge removal; Anaerobic Fixed Biofilm Bed (2); Aeration Chamber (3); Fixed Aerobic Biofilm Bed (4); Effluent Outlet Chamber (5) of the Biological Treatment; and High-Rate Tertiary Decanter (6).

This configuration of the system allows for the construction of more compact (verticalized) stations, with significantly lower implantation and operation costs than conventional configurations (UASB+Activated Sludge). Another important factor is the oxidation in the aerobic stage of the odorific gases generated in the anaerobic stage (volatile organic acids and sulphydric acid) before their release into the atmosphere, eliminating the problem of unpleasant smells at the plant.

The invention claimed is:

1. A fixed biofilm system combining anaerobic, aerobic and physicochemical treatment of a fluid in a combined reactor spanning a system height from a bottom to a top, the combined reactor comprising:
    a first zone comprising an anaerobic sludge feed and removal chamber;
    a second zone comprising a fixed anaerobic biofilm bed;
    a third zone comprising an aeration chamber;
    a fourth zone located within a fourth zone height portion of the system height and comprising a fixed aerobic biofilm bed;
    a fifth zone comprising an effluent outlet chamber; and
    a sixth zone comprising a tertiary decanter located within the fourth zone height portion, the tertiary decanter having a geometry selected from the group consisting of prismatic, cylindrical and conical, and the tertiary decanter configured to:
        operate at a hydraulic loading rate of over 50 m$^3$/m$^2$/d;
        receive suspended solids from the fifth zone and with dosed coagulant, perform sedimentation and compaction by a gravitational process; and
        discard sedimented sludge as a solid residue;
    wherein the system is configured for an ascending flow of the fluid along the system height from the bottom comprising the first zone to the top comprising the fifth zone; and
    wherein the system is further configured to have the fluid flow sequentially through the zones from the first zone through the sixth zone.

2. The system in accordance with claim 1, wherein the first zone is configured to:
    accept sewage into the anaerobic sludge feed and removal chamber and distribute it evenly across a base of the combined reactor through a network of pipes; and
    remove sedimented anaerobic sludge at the base of the combined reactor via trunk sewers.

3. The system in accordance with claim 1, wherein the fixed anaerobic biofilm bed comprises an anaerobic biofilm fixed to a porous supporting material;
    wherein the porous supporting material comprises a surface area over 90,000 m$^2$/m$^3$ and provides the fixed anaerobic biofilm bed with a porosity of over 65%; and
    wherein the porous supporting material is confined between fixed grilles maintaining the anaerobic biofilm in a fixed position downstream the anaerobic sludge feed and removal chamber and upstream the aeration chamber.

4. The system in accordance with claim 1, wherein the aeration chamber is configured to oxygenate the fixed aerobic biofilm bed upstream from the aeration chamber; and
    wherein the aeration chamber comprises air bubble ejectors fed by one or more water pumps and one or more air blowers.

5. The system in accordance with claim 1, wherein the fixed aerobic biofilm bed comprises an aerobic biofilm fixed to a porous supporting material;
    wherein the porous supporting material comprises a surface area over 90,000 m$^2$/m$^3$ and provides the fixed anaerobic biofilm bed with a porosity of over 65%; and
    wherein the porous supporting material is confined between fixed grilles maintaining the aerobic biofilm in a fixed position downstream the aeration chamber and upstream the effluent outlet chamber.

6. The system in accordance with claim 5, wherein the effluent outlet chamber comprises a network of uniformly treated effluent collection pipes located above the fixed grilles of the fixed aerobic biofilm bed; and
    wherein collected effluent is transported from the effluent outlet chamber through the network of uniformly treated effluent collection pipes and to the tertiary decanter.

7. The system in accordance with claim 1, wherein the first zone is configured such that from 60 to 70% of organic matter in the fluid is digested and transformed into biogas and surplus solids are discarded.

8. The system in accordance with claim 1, wherein the second and third zones are configured such that at least a portion of remaining organic matter and nitrogen compounds in the fluid are oxidized and removed; and
    wherein oxygen dissolved in the fluid in the aeration chamber is monitored and controlled by a field oximeter connected to an automatic control mesh.

9. The system in accordance with claim 1, wherein the biofilm of the second and fourth zones is formed in different layers and with microorganisms.

10. The system in accordance with claim 1 further comprising the fluid;
    wherein the fluid is sewage; and
    wherein the system is further configured to maintain a total hydraulic retention time of from 8 to 10 hours as the fluid flows sequentially through the zones from the first zone through the sixth zone.

11. A fixed biofilm system for treatment of a fluid entering at a bottom of tine system comprising:
    a first zone at the bottom of the system and comprising an anaerobic sludge feed and removal chamber;
    a second zone positioned above the first zone and comprising a fixed anaerobic biofilm bed;

a third zone positioned above the second zone and comprising an aeration chamber;

a fourth zone positioned above the third zone and comprising a fixed aerobic biofilm bed;

a fifth zone positioned above the fourth zone and comprising an effluent outlet chamber; and a sixth zone positioned above the third zone and comprising a tertiary decanter;

wherein the system is configured such that the fluid flows sequentially through the zones from the first zone through the sixth zone; and wherein the tertiary decanter:
has a geometry selected from the group consisting of prismatic, cylindrical and conical; and
is configured to:
operate at a hydraulic loading rate of over 50 m$^3$/m$^2$/d;
receive suspended solids from the fifth zone and with dosed coagulant, perform sedimentation and compaction by a gravitational process; and
discard sedimented sludge as a solid residue.

12. The system in accordance with claim 11, wherein the second and fourth zones are each configured to retain the respective fluid flow therethrough with a hydraulic retention time of from 3 to 5 hours.

13. The system in accordance with claim 11, wherein each of the zones are configured to retain the respective fluid flow therethrough with a total hydraulic retention time through the system of from 6 to 10 hours.

14. The system in accordance with claim 11, wherein each of the biofilm beds of the second and fourth zones comprise a biofilm fixed to a porous supporting material;
wherein the porous supporting material comprises a surface area over 90,000 m$^2$/m$^3$ and provides each of the biofilm beds with a porosity of over 65%; and
wherein the porous supporting material of each of the biofilm beds is confined between fixed grilles.

15. The system in accordance with claim 14, wherein each of the fixed grilles of the second and fourth zones present an open passage area therethrough for the passage of the fluid;
wherein each of the open passage areas is over 60% of the total area of the respective fixed grilles.

16. The system in accordance with claim 14, wherein each of the fixed grilles of the second and fourth zones comprise a material selected from the group consisting of steel, stainless steel, carbon steel, and PRFV.

17. The system in accordance with claim 11, wherein the system is further configured such that the fluid exits the fifth zone with a concentration of total suspended solids of less than about 50 mg/L.

18. The system in accordance with claim 11, wherein the system is further configured such that the fluid exits the sixth zone with a concentration of total phosphorus of less than about 1 mg/L.

19. The system in accordance with claim 11, wherein the system is further configured such that the fluid traverses at least one zone with an ascension velocity of at least 1.4 m/h.

* * * * *